(12) United States Patent
Ihara et al.

(10) Patent No.: US 11,034,624 B2
(45) Date of Patent: Jun. 15, 2021

(54) MANUFACTURING METHOD OF SILICON CARBIDE-BASED HONEYCOMB STRUCTURE

(71) Applicant: NGK INSULATORS, LTD., Nagoya (JP)

(72) Inventors: Chikashi Ihara, Nagoya (JP); Shinya Yoshida, Nagoya (JP); Masato Shimada, Nagoya (JP); Yoshiyuki Kamei, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 152 days.

(21) Appl. No.: 15/906,153

(22) Filed: Feb. 27, 2018

(65) Prior Publication Data
US 2018/0265419 A1 Sep. 20, 2018

(30) Foreign Application Priority Data
Mar. 17, 2017 (JP) .............................. JP2017-053687

(51) Int. Cl.
*C04B 35/101* (2006.01)
*C04B 38/00* (2006.01)
(Continued)

(52) U.S. Cl.
CPC ........ *C04B 38/0006* (2013.01); *B28B 11/243* (2013.01); *C04B 35/565* (2013.01);
(Continued)

(58) Field of Classification Search
CPC ... C04B 38/0006; C04B 35/64; B28B 11/243; B28B 3/20; B28B 2003/203
(Continued)

(56) References Cited

U.S. PATENT DOCUMENTS 4,372,902 A * 2/1983 Denton ................... C04B 35/64
  264/674
5,656,218 A * 8/1997 Lin ........................ C04B 35/565
  264/656

(Continued)

FOREIGN PATENT DOCUMENTS

JP  S58-091063 A  5/1983
JP  H06-279119 A  10/1994
(Continued)

OTHER PUBLICATIONS

Machine Translation of JPH-107465A, generated from Espacenet on Jul. 2, 2019 http://translationportal.epo.org/emtp/translate/?ACTION=description-retrieval&COUNTRY=JP&ENGINE=google&FORMAT=docdb&KIND=A&LOCALE=en_EP&NUMBER=H107465&OPS=ops.epo.org (Year: 1996).*

(Continued)

*Primary Examiner* — Alison L Hindenlang
*Assistant Examiner* — Andrés E. Behrens, Jr.
(74) *Attorney, Agent, or Firm* — Burr & Brown, PLLC

(57) ABSTRACT

A manufacturing method of a silicon carbide-based honeycomb structure, including a firing step of introducing extruded honeycomb formed bodies containing a silicon carbide-based component, together with firing members into a firing furnace, and firing the honeycomb formed bodies, to manufacture the silicon carbide-based honeycomb structure, wherein the firing members are formed by using a ceramic material containing 70 wt % or more of alumina, and the firing step further includes:
an inert gas supplying step of supplying an inert gas to a furnace space of the firing furnace, and
a gas adding step of adding a reducing gas to the furnace space.

7 Claims, 5 Drawing Sheets

(51) Int. Cl.
*C04B 35/64* (2006.01)
*C04B 35/565* (2006.01)
*B28B 3/20* (2006.01)
*B28B 11/24* (2006.01)

(52) U.S. Cl.
CPC ............... *C04B 35/64* (2013.01); *B28B 3/20* (2013.01); *B28B 2003/203* (2013.01); *C04B 2235/658* (2013.01); *C04B 2235/6582* (2013.01); *C04B 2235/661* (2013.01); *C04B 2235/664* (2013.01); *C04B 2235/77* (2013.01); *C04B 2235/96* (2013.01); *C04B 2235/9607* (2013.01); *C04B 2235/9623* (2013.01)

(58) Field of Classification Search
USPC .......................................................... 264/630
See application file for complete search history.

(56) References Cited

U.S. PATENT DOCUMENTS

| | | |
|---|---|---|
| 6,187,256 B1 | 2/2001 | Aslan et al. |
| 2004/0033893 A1 | 2/2004 | Tomita et al. |
| 2004/0118095 A1* | 6/2004 | Chikawa ............ B01D 39/2075 55/523 |
| 2005/0124483 A1 | 6/2005 | Morimoto et al. |
| 2016/0282248 A1* | 9/2016 | Ihara ........................ G01N 3/40 |

FOREIGN PATENT DOCUMENTS

| | | | |
|---|---|---|---|
| JP | H-107465 A | * | 6/1996 |
| JP | H09-162017 A1 | | 6/1997 |
| JP | H10-007465 A1 | | 1/1998 |
| JP | H11-513355 A | | 11/1999 |
| JP | 2002-356383 A | | 12/2002 |
| JP | 2003-247412 A | | 9/2003 |
| JP | 2007-254237 A | | 10/2007 |
| JP | 2008-273809 A1 | | 11/2008 |

OTHER PUBLICATIONS

Thurman, Doug. "High-Purity Alumina Kiln Furniture for Industrial High-Temperature Applications." Ceramic Forum International, vol. 9, Sep. 1, 2015, pp. E1-E2., doi:https://c9aad7f5-39ef-4d53-8bef-378cad26d788.filesusr.com/ugd/316308_c0133931b4b2478eb41d0746e1e2fa66.pdf. (Year: 2015).*
"Ellingham Diagram." Wikipedia, Wikimedia Foundation, Dec. 25, 2016, web.archive.org/web/20161225091031if_/en.wikipedia.org/wiki/Ellingham_diagram#Reducing_agents. (Year: 2016).*
Japanese Office Action (with English translation), Japanese Application No. 2017-053687, dated Aug. 20, 2019 (8 pages).

* cited by examiner

US 11,034,624 B2

MANUFACTURING METHOD OF SILICON CARBIDE-BASED HONEYCOMB STRUCTURE

"The present application is an application based on JP-2017-053687 filed on Mar. 17, 2017 with Japan Patent Office, the entire contents of which are incorporated herein by reference."

BACKGROUND OF THE INVENTION

Field of the Invention

The present invention relates to a manufacturing method of a silicon carbide-based honeycomb structure, and more particularly, it relates to a manufacturing method of a silicon carbide-based honeycomb structure in which an operation efficiency of a firing furnace improves and a life of firing members to be introduced together with honeycomb formed bodies into a furnace space of the firing furnace lengthens.

Description of the Related Art

Heretofore, honeycomb structures made of ceramics have been used in broad use applications to a car exhaust gas purifying catalyst carrier, a diesel particulate removing filter, a heat reservoir for a burning device, and the like. Such a honeycomb structure made of ceramics (hereinafter referred to simply as "the honeycomb structure") is manufactured by extruding a forming material (a kneaded material) into a desirable honeycomb shape by use of an extruder and then firing a honeycomb formed body on predetermined firing conditions. Here, as a material of the honeycomb structure, a ceramic material such as cordierite having a very small thermal expansion coefficient is used, or a silicon carbide-based ceramic material containing a silicon carbide-based component and having a very high heat resistance is also used occasionally.

In particular, the diesel particulate removing filter is exposed to high temperatures, when trapped diesel particulates are incinerated to regenerate the filter, and hence, there is frequently employed a silicon carbide-based honeycomb structure (an Si/SiC honeycomb structure) in which the above silicon carbide having the high heat resistance is used. The ceramic material containing the silicon carbide-based component has excellent advantages, for example, the high heat resistance, but its thermal expansion coefficient is larger than that of a cordierite-based material or the like, thereby causing the possibility that the thermal stress fracture occurs due to the high temperature or the like during such burning regeneration of the filter.

To prevent these defects, the filter is divided into small blocks during the manufacturing of the filter. For example, the honeycomb formed body extruded into a quadrangular shape is fired to prepare a honeycomb segment (a honeycomb fired body), and then a plurality of obtained honeycomb segments are combined and bonded to one another by use of a bonding material, thereby forming one large block of honeycomb structure (a honeycomb block body). Afterward, a circumferential surface of the honeycomb block body is ground, and the ground circumferential surface is coated with a circumference coating material to form a circumferential wall, thereby manufacturing a honeycomb structure having a large honeycomb diameter.

At this time, in a firing step of firing the honeycomb formed bodies, three firing furnaces are used as follows. That is, there are used a binder removing furnace to heat and remove organic materials, carbides and the like included in the honeycomb formed bodies at a comparatively low temperature (e.g., about 500° C.) in the atmospheric air prior to main firing, a main firing furnace disposed after the binder removing furnace to heat the honeycomb formed bodies at a high firing temperature in an inert gas atmosphere of argon or the like for a long time, and an oxidation furnace disposed after the main firing furnace to perform oxidation in the atmospheric air, thereby forming protective films on the surfaces of honeycomb fired bodies. Through the firing steps (a binder removing step, a main firing step, and an oxidation step) by use of the respective firing furnaces, the firing of the honeycomb fired bodies of the honeycomb segments is completed.

Here, for the purpose of improving productivity, a plurality of quadrangular prismatic columnar honeycomb formed bodies 101 are collectively introduced at a time into a firing furnace 100 for use in the firing step (the main firing step) to be performed in the inert gas atmosphere (refer to FIG. 7). In this case, there is used a stacked body 107 constructed by stacking firing members 106 (so-called "kiln tools") such as a base plate 102, shelf plates 103, frame bodies 104, and a top plate 105, and the plurality of honeycomb formed bodies 101 are arranged in parallel and stored in the stacked body 107. In this state, the honeycomb formed bodies are introduced into a furnace space 108 of the firing furnace 100, and the firing at the high temperature is performed.

Description is further made in detail as to a constitution of the stacked body 107. The shelf plate 103 having a rectangular shape is mounted on the base plate 102 having a flat plate shape and disposed in a lowermost part, and further on a shelf plate surface (an upper surface) of the shelf plate 103, the plurality of honeycomb formed bodies 101 are aligned and mounted. Afterward, the prismatic tubular frame body 104 formed with a frame height higher than a formed body height of each honeycomb formed body 101 is mounted on the above shelf plate surface to surround the mounted honeycomb formed bodies 101. Afterward, a new shelf plate 103 is mounted on a frame body upper surface of the mounted frame body 104. This operation is repeated, and the top plate 105 is disposed on the frame body upper surface of the frame body 104 of a top stage, thereby constituting the stacked body 107 in which the firing members 106 are stacked in multiple stages.

In the firing members 106 (the stacked body 107), nitride bonded silicon carbide which contains a nitride such as silicon nitride ($Si_3N_4$) is occasionally used as a main material. When the firing member 106 made of this nitride bonded silicon carbide is exposed to the high temperature during the firing step, a part of the member gradually decomposes, and is occasionally present as a decomposition product 109, for example, SiO vapor in the furnace space 108.

The decomposition product 109 reacts with an oxygen component 110 which remains in the furnace space 108 adjusted under the inert gas atmosphere of an argon gas or the like, and functions as a so-called "oxygen getter" which removes the oxygen component 110 from the furnace space 108. As a result, there is obtained an excellent advantage that a low oxygen state of the furnace space 108 of the firing furnace 100 is stabilized. Therefore, the firing member 106 made of the above nitride bonded silicon carbide is frequently used.

On the other hand, when a ceramic formed body such as the honeycomb formed body is fired in a non-oxidation atmosphere, a reducing gas is added to the inert gas. For example, it is known that in a method of manufacturing an aluminum nitride sintered body from an aluminum nitride formed body, a carbon dioxide gas is mixed into the inert gas in a binder removing treatment, a hydrogen gas is further mixed into the inert gas in a firing treatment, and in this state, firing treatments are performed (see Patent Document 1).

Furthermore, it is known that for the purpose of adjusting a firing atmosphere to a uniform atmosphere and decreasing variations in shape, color, characteristics and the like, a substance to decrease an oxygen concentration in the firing furnace is added, to prepare uniform ceramic electronic components (see Patent Document 2), or it is known that firing is performed in an atmosphere of a mixed gas of the inert gas and the reducing gas in a process of manufacturing a ferrite sintered body (see Patent Document 3).

[Patent Document 1] JP-A-H10-007465
[Patent Document 2] JP-A-H09-162017
[Patent Document 3] JP-A-2008-273809

SUMMARY OF THE INVENTION

However, in the use of firing members in which the above-mentioned nitride bonded silicon carbide is used as a main component (see FIG. 7), there is the possibility that defects mentioned below occur. That is, when the firing members are repeatedly used in each firing step, a decomposition product 109 gradually flows out to a furnace space 108, and a thickness, size or the like of each of firing members 106 which is used plural times gradually becomes smaller than that of the firing member before used. As a result, the firing members 106 in which nitride bonded silicon carbide is used have the defect that its useful life shortens.

Furthermore, a part of the decomposed decomposition product 109 bonds to an oxygen component 110 remaining in the furnace space 108 of the firing furnace 100, thereby generating a reactant 111 such as silicon dioxide. A part of the reactant 111 of silicon dioxide or the like is discharged from the furnace space 108 through a gas discharge hole 112 to the outside of the furnace, but the residual part might be deposited on a furnace wall 113 or the like of the firing furnace 100 (see FIG. 7).

A furnace temperature of the furnace space 108 is unbalanced due to the deposition of the reactant 111, and hence, there is the possibility that it becomes difficult to stably perform firing on firing conditions or that the deposited reactant 111 or the like comes in contact with the stacked body 107 in the firing furnace 100. Furthermore, in the case of a continuous firing furnace, there is disturbed movement of the stacked body 107 in which honeycomb formed bodies 101 are stored, in a horizontal direction.

Therefore, to eliminate the above defects, there is required an operation of periodically stopping an operation of the firing furnace and removing the reactant 111 of silicon dioxide or the like deposited on the furnace wall 113, or the like. As a result, a time to be spent in stopping the operation of the firing furnace 100 and removing the reactant 111 lengthens, an operation efficiency of the firing furnace 100 might deteriorate, and furthermore, a manufacturing efficiency of a honeycomb structure might be adversely affected.

On the other hand, when ceramic formed bodies are fired as described in Patent Documents 1 to 3, a reducing gas is added to an inert gas, but this addition is performed mainly for the purpose of preventing change of color, warpage and the like of fired ceramic products and stabilizing a product quality. Furthermore, such conventional technologies are different from the present application in that lengthening of the life of the firing member or improvement of the operation efficiency of the firing furnace is not intended and especially in that manufacturing of a silicon carbide-based honeycomb structure is not presumed.

Therefore, the present invention has been developed in view of the above actual circumstances, and an object thereof is to provide a manufacturing method of a silicon carbide-based honeycomb structure in which improvement of an operation efficiency of a firing furnace during a firing step is achievable and a long life of firing members for use during firing is achievable, in manufacturing the honeycomb structure containing a silicon carbide-based component.

According to the present invention, there is provided a manufacturing method of a silicon carbide-based honeycomb structure as follows.

According to a first aspect of the present invention, a manufacturing method of a silicon carbide-based honeycomb structure is provided, including a firing step of introducing extruded honeycomb formed bodies containing a silicon carbide-based component, together with firing members into a firing furnace, and firing the honeycomb formed bodies, to manufacture the silicon carbide-based honeycomb structure, wherein the firing members are formed by using a ceramic material containing 70 wt % or more of alumina, and the firing step further includes an inert gas supplying step of supplying an inert gas to a furnace space of the firing furnace, and a gas adding step of adding a reducing gas to the furnace space.

According to a second aspect of the present invention, the manufacturing method of the silicon carbide-based honeycomb structure according to the above first aspect is provided, further including a gas premixing step of mixing the inert gas and the reducing gas to generate a mixed gas, wherein in the inert gas supplying step and the gas adding step, the mixed gas is supplied or added.

According to a third aspect of the present invention, the manufacturing method of the silicon carbide-based honeycomb structure according to the above first aspect is provided, wherein the gas adding step is performed after the furnace space is adjusted under an inert gas atmosphere by the inert gas supplying step.

According to a fourth aspect of the present invention, the manufacturing method of the silicon carbide-based honeycomb structure according to any one of the above first to third aspects is provided, wherein in the gas adding step, the reducing gas is added to the furnace space under the inert gas atmosphere so that a concentration of the gas is from 1 ppm to 5000 ppm.

According to a fifth aspect of the present invention, the manufacturing method of the silicon carbide-based honeycomb structure according to any one of the above first to fourth aspects of the present invention is provided, wherein as the reducing gas, at least one of a hydrocarbon gas, hydrogen gas and carbon monoxide gas is utilized.

According to a sixth aspect of the present invention, the manufacturing method of the silicon carbide-based honeycomb structure according to any one of the above first to fifth aspects is provided, wherein the firing members include shelf plates on which the honeycomb formed bodies are to be mounted, and frame bodies which surround the honeycomb formed bodies mounted on the shelf plates and on and under which the honeycomb formed bodies are mounted.

According to a seventh aspect of the present invention, the manufacturing method of the silicon carbide-based honeycomb structure according to any one of the above first to sixth aspects is provided, wherein the inert gas is an argon gas.

According to a manufacturing method of a silicon carbide-based honeycomb structure of the present invention, a firing step is performed by using firing members in which a ceramic material containing 70 wt % or more of alumina is used, and a reducing gas is added to a furnace space adjusted under an inert gas atmosphere, so that an amount of a reactant to be deposited on a furnace wall can decrease and an operation efficiency of a firing furnace can improve.

DESCRIPTION OF THE PREFERRED EMBODIMENTS

Figure 1:
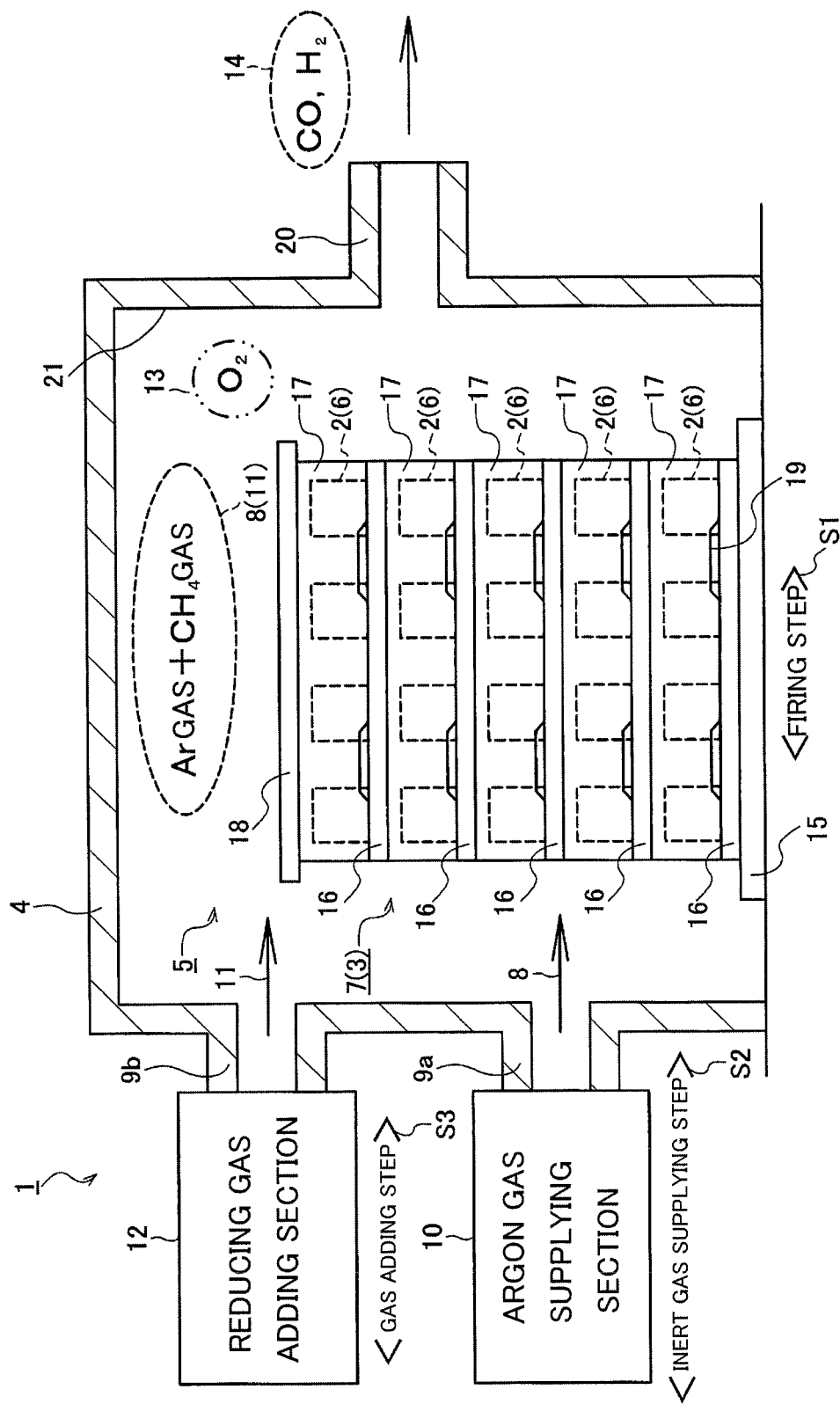
FIG. 1 is an explanatory view schematically showing a gas behavior of a furnace space of a firing furnace in a manufacturing method of a silicon carbide-based honeycomb structure of the present embodiment.

Hereinafter, description will be made as to an embodiment of a manufacturing method of a silicon carbide-based honeycomb structure of the present invention with reference to the drawings. The manufacturing method of the silicon carbide-based honeycomb structure of the present invention is not limited to the following embodiment, and a change, a modification, an improvement and the like are addable without departing from the gist of the present invention.

A manufacturing method 1 of the silicon carbide-based honeycomb structure of an embodiment of the present invention (hereinafter referred to simply as "the manufacturing method 1") is concerned with a firing treatment of introducing honeycomb formed bodies 2 containing a silicon carbide-based component together with firing members 3 into a furnace space 5 of a firing furnace 4, and firing the honeycomb formed bodies, to manufacture honeycomb segments 6 (corresponding to honeycomb fired bodies).

As shown mainly in FIG. 1, the manufacturing method 1 of the present embodiment includes a firing step S1 of firing a plurality of quadrangular prismatic columnar honeycomb formed bodies 2 formed by extruding a forming raw material from an extruder (not shown), at a high firing temperature (e.g., 1400° C. or more) in a state where the honeycomb formed bodies are stored in a stacked body 7 constituted by combining the firing members 3 with one another, to manufacture the honeycomb segments 6.

The firing step S1 further includes an inert gas supplying step S2 of supplying an argon gas 8 (corresponding to an inert gas of the present invention) to the furnace space 5 into which there are introduced the honeycomb formed bodies 2 and the stacked body 7 sent out from a binder removing furnace (not shown) subjected to a binder removing step of a previous step and having fats and oils, organic materials and the like removed therefrom, and adjusting the furnace space 5 under a non-oxidizing argon gas atmosphere (corresponding to an inert gas atmosphere of the present invention), and a gas adding step S3 of adding a reducing gas 11 to the furnace space 5. It is to be noted that the furnace space 5 is not limited to the adjustment under the argon gas atmosphere, and the furnace space may be adjusted to another non-oxidizing rare gas or nitrogen gas, or the like. Furthermore, the firing temperature can optionally be set in accordance with the honeycomb formed body 2 of a firing object.

Here, there are not any special restrictions on an order of the supplying of the argon gas 8 and the addition of the reducing gas 11 to the furnace space 5. For example, there may be performed a gas premixing step of adding the reducing gas 11 to the argon gas 8 at a predetermined mixing ratio to generate a mixed gas (not shown), and the mixed gas may be supplied or added to the furnace space 5.

Alternatively, there may be performed the gas adding step S3 of beforehand supplying the argon gas 8 to the furnace space 5, adjusting the furnace space under the argon gas atmosphere, and then adding the reducing gas 11. In addition, the reducing gas 11 may further be added after the mixed gas is supplied to the furnace space 5. It is to be noted that to simplify the description of the manufacturing method 1 of the present embodiment, description is mainly made as to an example where the reducing gas 11 is added after the furnace space 5 is adjusted under the argon gas atmosphere by use of the argon gas 8.

Here, the firing furnace 4 in which the firing step S1 is to be performed has the furnace space 5 closed to the outside of the furnace (the atmospheric air), and includes an argon gas supplying section 10 which includes a gas flow path 9a communicating with a part of the furnace space 5 and supplies the argon gas 8 to the furnace space 5 to adjust the furnace space under the argon gas atmosphere, and a reducing gas adding section 12 which includes a gas flow path 9b communicating with a part of the furnace space 5 and adds the reducing gas 11 to the furnace space 5 adjusted under the argon gas atmosphere. Here, the argon gas supplying section 10 is for use in the inert gas supplying step S2 mentioned above, whereas the reducing gas adding section 12 is for use in the gas adding step S3 mentioned above. It is to be noted that when the method includes the above-mentioned gas premixing step, a gas premixing section is disposed to generate the mixed gas from the argon gas 8 and the reducing gas 11, and the mixed gas is supplied from the gas premixing section to the furnace space 5.

It is to be noted that the firing furnace 4 to perform the firing step S1 (a main firing step) may have a structure of a so-called "single firing furnace (firing kiln)" schematically shown in FIG. 1, or a continuous firing furnace. The single firing furnace may include a constitution of a decompressing section or the like which deaerates and decompresses the furnace space 5, to perform the inert gas supplying step S2. On the other hand, in the case of the continuous firing furnace, main firing can be performed while moving the honeycomb formed bodies 2 and the stacked body 7 introduced from one furnace open end into the furnace space, at a constant speed along a horizontal direction, until the honeycomb formed bodies and the stacked body reach the other furnace open end. In this case, a gas replacement chamber is disposed to be connected to the respective furnace open ends. Then, an interior space of the gas replacement chamber is deaerated and decompressed by utilizing an airtight shutter which can open, and close in a state of keeping airtightness between the furnace space and the outside of the furnace, and then a replacement treatment to charge the argon gas can be performed.

In the manufacturing method 1 of the present embodiment, the reducing gas 11 to be added by the gas adding step S3 is adjusted in a gas concentration range of 1 ppm to 5000 ppm and further preferably 100 ppm to 2400 ppm to the furnace space 5 adjusted under the argon gas atmosphere.

Specifically, the reducing gas 11 may function as a so-called "oxygen getter" (details will be described later), to react with an oxygen component 13 which remains in the furnace space 5 during the firing step S1, so that the furnace space 5 can be adjusted into a stable low oxygen state. Here, when the gas concentration of the reducing gas 11 is lower than 1 ppm, an effect of the oxygen getter cannot sufficiently be exerted, and when the gas concentration is higher than 5000 ppm, there is a high possibility of occurrence of the defect that the added reducing gas 11 is carbonized as it is in the furnace space 5, or the like. Therefore, the gas concentration of the reducing gas 11 is prescribed in the above range.

Furthermore, there are not any special restrictions on the reducing gas 11 to be added to the furnace space 5 by use of the reducing gas adding section 12 in the gas adding step S3, and the reducing gas may be a hydrocarbon gas such as a methane gas, an ethylene gas or a propane gas, hydrogen gas or carbon monoxide gas as long as the reducing gas reacts with the oxygen component 13 at a high temperature and is capable of forming a reactant 14. Furthermore, a plurality of types of gases among the above-mentioned various types of gases may be mixed. Here, in the manufacturing method 1 of the present embodiment, it is presumed that the methane gas is used as the reducing gas 11 in the following description.

Figure 2:
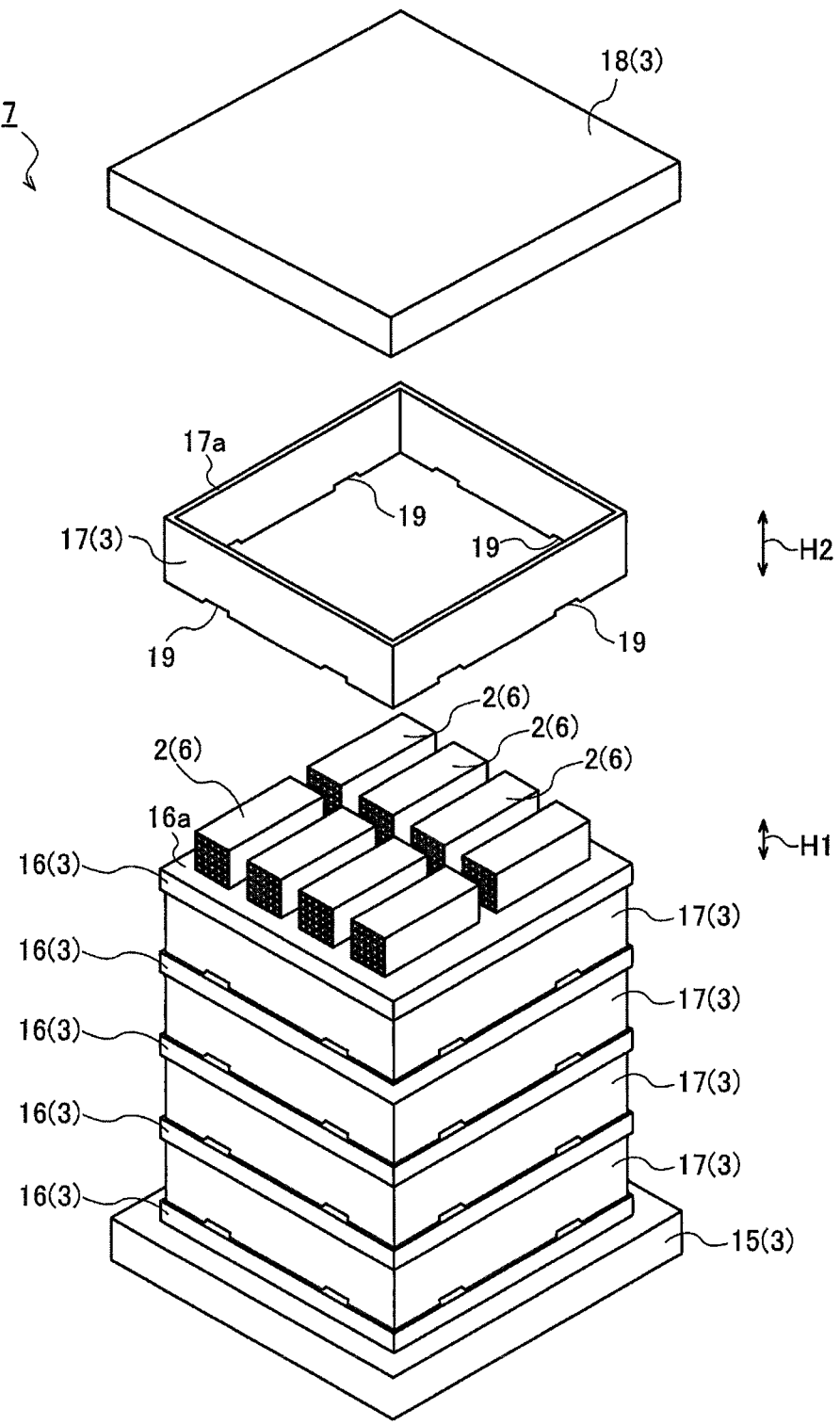
FIG. 2 is an exploded perspective view schematically showing an example of each of a stacked body, firing members, and honeycomb formed bodies stored in the stacked body.

Furthermore, as the stacked body 7 to be introduced into the furnace space 5 of the firing furnace 4, such a stacked body as shown in FIG. 2 is usable. That is, the stacked body includes a base plate 15 having a flat plate shape and disposed in a lowermost part, rectangular shelf plates 16 mounted on the base plate 15, and a plurality of honeycomb formed bodies 2 aligned and arranged in parallel on a shelf plate surface 16*a* (an upper surface) of each shelf plate 16. It is to be noted that in the manufacturing method 1 of the present embodiment, 8 honeycomb formed bodies 2 in total of 4 bodies in length×2 bodies in width are aligned on the shelf plate surface 16*a* of one shelf plate 16.

In the manufacturing method 1 of the present embodiment, each honeycomb formed body 2 to be introduced into the furnace space 5 has latticed partition walls defining a plurality of cells extending from one end face to the other end face, and is formed into a substantially quadrangular prismatic columnar shape and made of a ceramic material containing a silicon carbide-based component as a main component. The honeycomb formed body 2 is fired to form the honeycomb segment, and a plurality of honeycomb segments are combined to construct the honeycomb structure having a large diameter.

Afterward, a prismatic tubular frame body 17 formed with a frame height H2 higher than a height (a formed body height H1) of one side of the quadrangular prismatic columnar honeycomb formed body 2 (H2>H1) is mounted on the shelf plate surface 16*a*, to surround the mounted honeycomb formed bodies 2. It is to be noted that two cutouts 19 through which the gas or the like passes are provided in two regions of each side of a lower surface of the frame body 17. Afterward, a new shelf plate 16 is mounted on a frame body upper surface 17*a* of the mounted frame body 17.

At this time, the frame height H2 is higher than the formed body height H1, and hence, when the shelf plate 16 is mounted on the frame body upper surface 17*a* of the frame body 17, upper portions of the honeycomb formed bodies 2 do not come in contact with the shelf plate 16. That is, the firing members 3 can be stacked in a state where a space is provided between the honeycomb formed body 2 and the shelf plate 16. Such an operation is repeated, and a top plate 18 is disposed on the frame body upper surface 17*a* of the frame body 17 of a top stage, thereby constructing the stacked body 7 in which the firing members 3 are stacked in multiple stages and a plurality of honeycomb formed bodies 2 are aligned and stored.

Here, in the manufacturing method 1 of the present embodiment, each of the firing members 3 (the base plate 15, the shelf plates 16, the frame bodies 17 and the top plate 18) constituting the stacked body 7 is formed by using a ceramic material containing 70 wt % or more of alumina.

Figure 7:
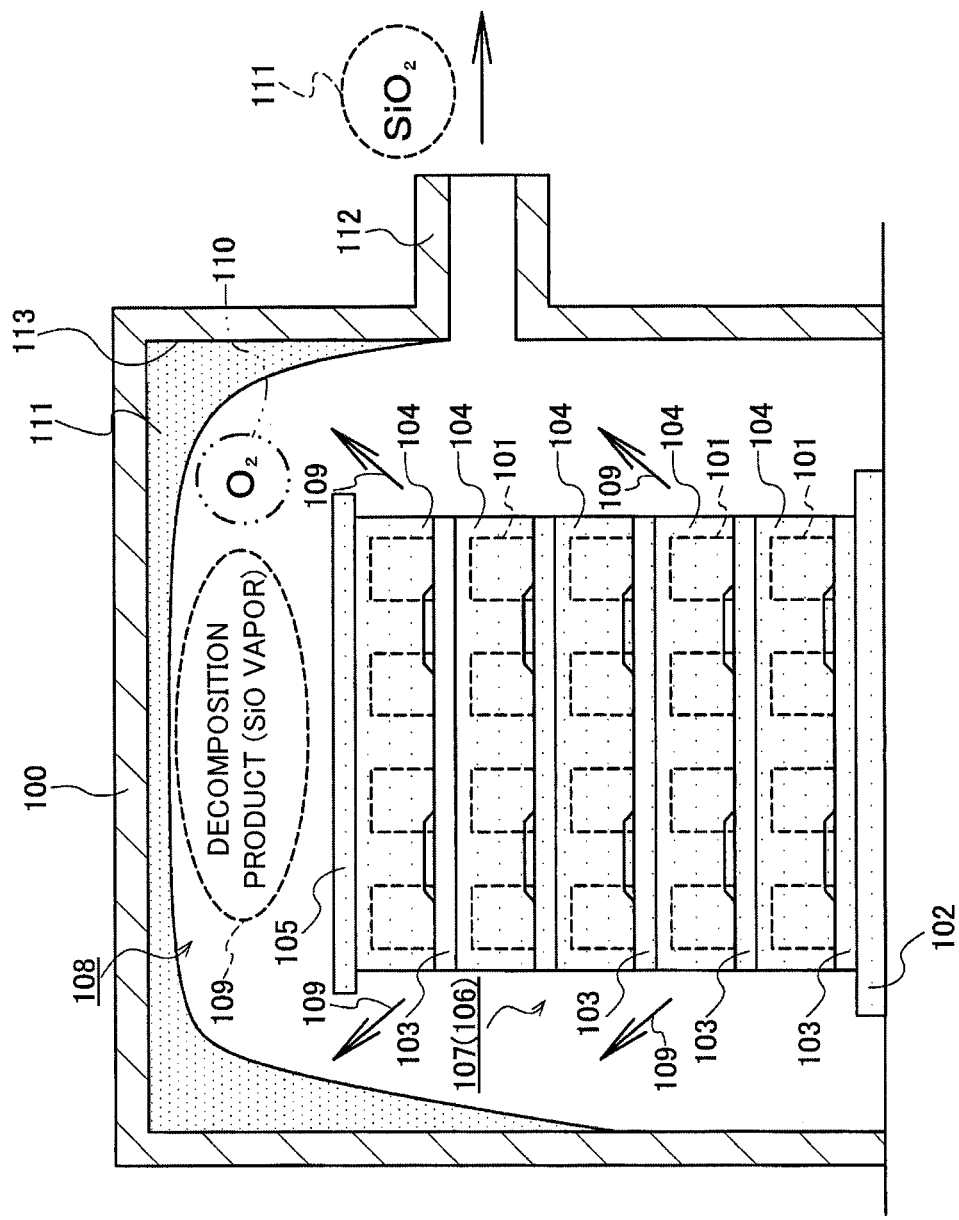
FIG. 7 is an explanatory view schematically showing a gas behavior of a furnace space of a conventional firing furnace.

According to the manufacturing method 1 of the present embodiment, the ceramic material containing 70 wt % or more of alumina is used as the firing members 3 (the stacked body 7), and hence, even when the stacked body is exposed to a high temperature during the firing step S1, a decomposition product 109 such as SiO vapor is prevented from being generated in firing members 106 (see FIG. 7) made of a conventional ceramic material which contains nitride bonded silicon carbide as a main component. In consequence, even when the firing members 3 are repeatedly used in the firing step S1, there does not occur the defect that a thickness of each of constitutions of the base plate 15, the shelf plates 16, the frame bodies 17 and the top plate 18 decreases or that a volume of the constitution decreases.

As a result, a longer life of the firing members 3 is achievable than in the conventional technology. It is to be noted that the firing members 3 are not limited to the above-mentioned constitutions of the base plate 15, the shelf plates 16 and others, and there are not any special restrictions on the firing members as long as the members are introduced together with the honeycomb formed bodies 2 into the furnace space 5 and exposed to the high temperature. Furthermore, all the constitutions of the firing members 3 do not have to be made of the ceramic material containing 70 wt % or more of alumina, and at least parts of the constitutions may be made of the ceramic material in the above range.

However, when the ceramic material containing 70 wt % or more of alumina is used in the firing members 3, there is a possibility of occurrence of a problem as follows. Specifically, in the conventional technology, a part of nitride-bonded silicon carbide decomposes at the high temperature, to generate the decomposition product 109, and the decomposition product 109 functions as "an oxygen getter", to react with an oxygen component 110 which remains in a furnace space 108, thereby generating a reactant 111.

Consequently, the residual oxygen component 110 is removed from the furnace space 108, so that it is possible to bring the furnace space 108 into a stable low oxygen state.

However, in the manufacturing method 1 of the present embodiment, the decomposition product 109 which functions as the oxygen getter is not present in the furnace space 5, and hence, the above effect cannot be acquired. Therefore, there is the possibility that it is difficult to maintain the furnace space 5 in the low oxygen state.

To eliminate such a possibility, in the manufacturing method 1 of the present embodiment, a micro amount of reducing gas 11 is added to the furnace space 5 adjusted under the inert gas atmosphere (the argon gas atmosphere) in a gas concentration range of 1 ppm to 5000 ppm (the gas adding step S3). The reducing gas 11 reacts with the oxygen component 13 which remains in the furnace space 5, and generates the reactant 14 to remove the oxygen component 13, so that it is possible to maintain the stable low oxygen state. That is, the reducing gas 11 which functions as the oxygen getter is purposely added to the furnace space 5.

It is to be noted that in the manufacturing method 1 of the present embodiment, the use of the methane gas as the reducing gas 11 is presumed. Therefore, by the reaction of the oxygen component of the furnace space 5 with the reducing gas 11 (the methane gas), a carbon monoxide gas and a hydrogen gas are generated as the reactant 14. Here, the generated reactant 14 is a gas, and is discharged to the outside of the firing furnace 4 through a gas discharge hole 20 opened in a part of the firing furnace 4.

Specifically, according to the manufacturing method 1 of the present embodiment, the reducing gas 11 which functions as the oxygen getter is added while adjusting an amount of the gas to be added, to generate the gaseous reactant 14 of carbon monoxide gas, hydrogen gas or the like, and this reactant can immediately be discharged to the outside of the furnace.

Consequently, it is possible to maintain the furnace space 5 in the low oxygen state, and it is possible to manufacture the honeycomb segments 6 having a stable quality without causing unevenness in firing conditions of the honeycomb formed bodies 2. In particular, a gas such as the carbon monoxide gas can immediately be discharged to the outside of the firing furnace 4, and hence, the reactant 111 of silicon dioxide in the conventional technology (see FIG. 7) is not deposited on a furnace wall 21 of the firing furnace 4. The reactant 14 is not deposited on the furnace wall 21, and hence, there does not occur the defect that the furnace temperature of the furnace space 5 is unbalanced, or the like.

In consequence, it is possible to fire the honeycomb formed bodies 2 on stable firing conditions. Furthermore, deposits, e.g., the conventional reactant 111 to be deposited on the furnace wall 21 are hardly deposited, and hence, an interval between cleaning works to remove such deposits from the firing furnace 4 can lengthen. Specifically, the firing furnace 4 can continuously operate over a long period, and an operation efficiency can improve. Furthermore, in the case of the continuous firing furnace, the movement of the stacked body 7 and the honeycomb formed bodies 2 at the constant speed along the horizontal direction in the furnace space 5 is not disturbed by the deposition of the reactant 111.

EXAMPLES

Hereinafter, description will be made as to a manufacturing method of a silicon carbide-based honeycomb structure of the present invention on the basis of the following examples, but the manufacturing method of the silicon carbide-based honeycomb structure of the present invention is not limited to these examples.

1. Preparation of Firing Member

A firing member (an example) was prepared by using a ceramic material containing 70 wt % or more of alumina of the present embodiment described above, whereas a firing member (a comparative example) was prepared by using heretofore used nitride bonded silicon carbide.

2. Weight Change Ratio

Figure 3:
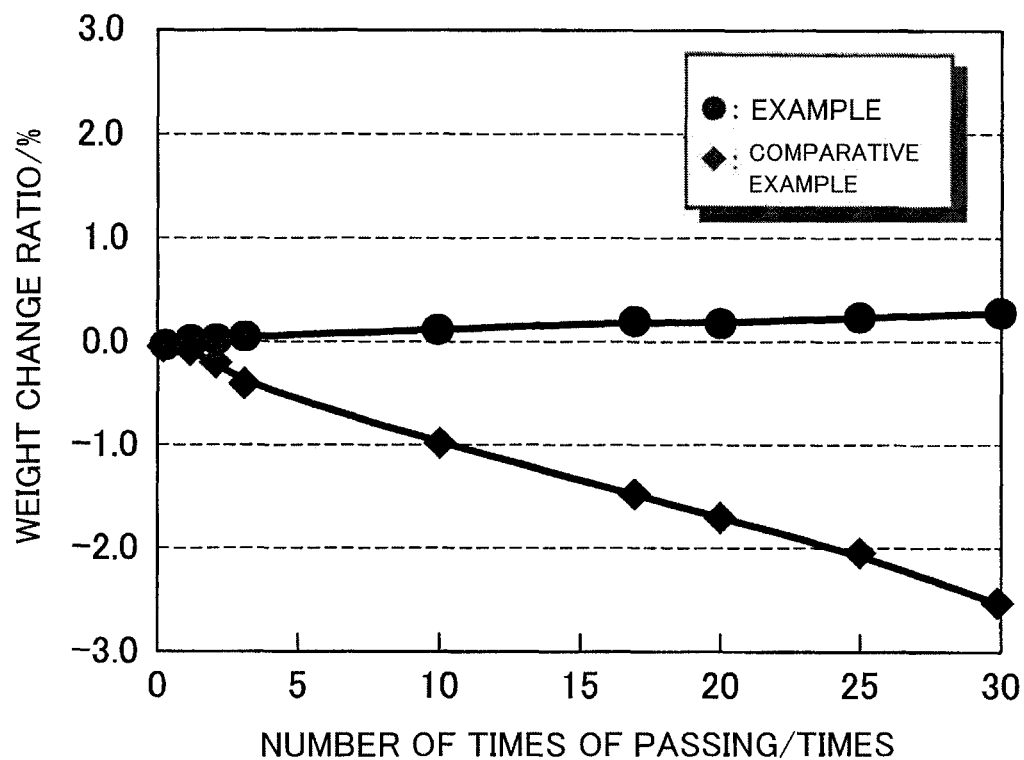
FIG. 3 is a graph showing weight change ratios of an alumina-containing firing member (an example) and a nitride bonded silicon carbide-containing firing member (a comparative example)

A weight of each of the obtained firing members (the example and the comparative example) was measured every time (passing time) the firing member was passed through a firing furnace at an adjusted furnace temperature to fire a honeycomb formed body, and a weight change ratio was formulated on the basis of a weight when the member was not passed (0 times). The other conditions were common with the example and the comparative example. In this case, any reducing gas was not added. A graph of FIG. 3 shows the results.

According to this graph, in the firing member of the comparative example, decrease of about 2.5 wt % is recognized at 30 passing times, but in the firing member of the example, increase of about 0.2 wt % is recognized. It is to be noted that the weight does not actually increase, and hence, it is considered that such weight increase is caused by dust or the like adhered to the firing member in the firing furnace.

3. Measurement of Pressure Rise Amount

Figure 4:
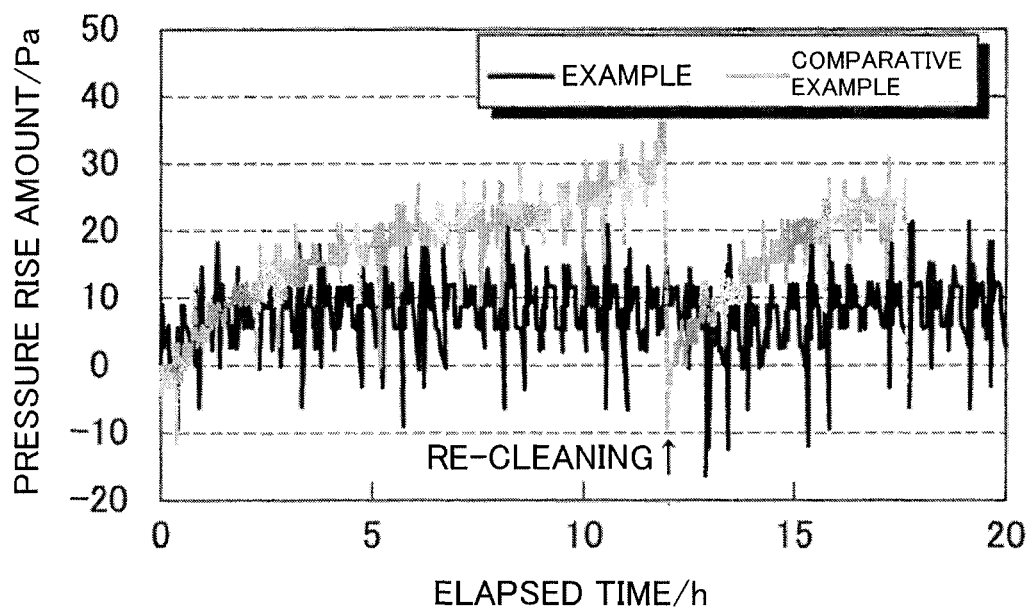
FIG. 4 is a graph showing changes of furnace pressures of firing furnaces of the alumina-containing firing member (the example) and the nitride bonded silicon carbide-containing firing member (the comparative example)

Next, it was verified that an effect of inhibiting generation of a decomposition product of SiO vapor or the like was produced by the use of the firing member of the example. However, it was difficult to directly measure an amount of the decomposition product (the dust) of the SiO vapor or the like generated during a firing step, and hence, a pressure rise amount due to dust clogging in an exhaust valve disposed in the firing furnace was measured. FIG. 4 is a graph in which the abscissa indicates a time elapsed from a state where the dust clogging in the exhaust valve is removed to perform cleaning (an elapsed time=0 h), and the ordinate indicates the pressure rise amount in each elapsed time. It is to be noted that at the elapsed time=12 h, re-cleaning to remove the dust clogging in the exhaust valve is performed (see an arrow mark on the graph).

According to this graph, it has been confirmed that when the firing member of the comparative example is used, the pressure rise amount rises to the right in accordance with the elapse of time. Consequently, it has been confirmed that the cleaning is necessary to remove the dust clogging in the exhaust valve in accordance with each elapse of 12 h. On the other hand, in the case of the firing member of the example, it has been confirmed that the pressure rise amount does not especially noticeably vary, and the dust clogging in the exhaust valve hardly occurs. In consequence, it has been confirmed that the effect of inhibiting the generation of the decomposition product of the SiO vapor or the like is sufficiently produced by the firing member.

4. Effect of Addition of Reducing Gas

Figure 5:
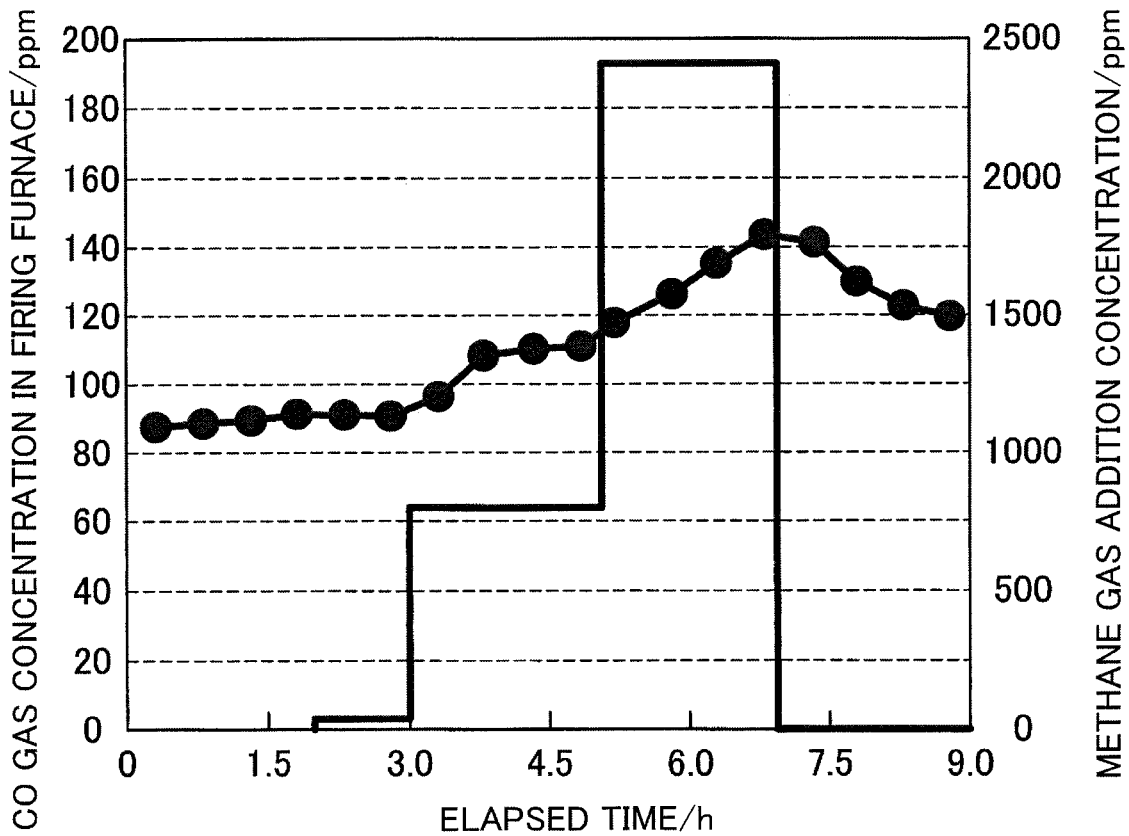
FIG. 5 is a graph showing a change of a CO gas concentration in the firing furnace in accordance with addition of a methane gas.

It has been confirmed that the reducing gas is added to a furnace space, and functions as an oxygen getter. Specifically, a methane gas was added as the reducing gas together with an inert gas (argon) to the firing furnace while changing concentrations of the gases. In this case, FIG. 5 is a graph showing changes of values of the methane gas addition concentration/ppm (hereinafter referred to as "the methane gas concentration") and the concentration of a CO gas in the firing furnace/ppm (hereinafter referred to as "the CO gas concentration"). Additionally, the methane gas concentrations were changed to 100 ppm, 800 ppm, and 2400 ppm, respectively.

According to this graph, it has been confirmed that when the methane gas is added as the reducing gas to the firing furnace, the CO gas concentration (see "." of FIG. 5) rises. Further specifically, when the methane gas concentration was changed to 100 ppm, the CO gas concentration slightly rose to 90 ppm, and when the methane gas concentration was changed to 800 ppm, the CO gas concentration rose up to 110 ppm. Furthermore, when the methane gas concentration was raised to 2400 ppm, the CO gas concentration indicated 140 ppm. At this time, an oxygen concentration in the firing furnace was stable at 25 ppm that was a measurement lower limit (not shown). Consequently, when the methane gas was used as the reducing gas, the methane gas functioned as the oxygen getter, and it was possible to keep the constant oxygen concentration in the firing furnace. Additionally, the generated CO gas or the like (a reactant) was discharged to the outside of the furnace as the gas through a gas discharge hole provided in the firing furnace.

5. Firing in which Firing Member was Used

The firing of the honeycomb formed body was performed by using the firing member of the example. As a result, there has not been confirmed a whitening phenomenon of a honeycomb fired body due to adhesion of SiO generated when the oxygen concentration heightens (not shown). Furthermore, it has been confirmed that characteristics such as porosity, thermal conductivity, and compressive strength are also equal to those in the use of the firing member of the comparative example (which are not shown).

6. Comparison of Initial Pressure Loss

Figure 6:
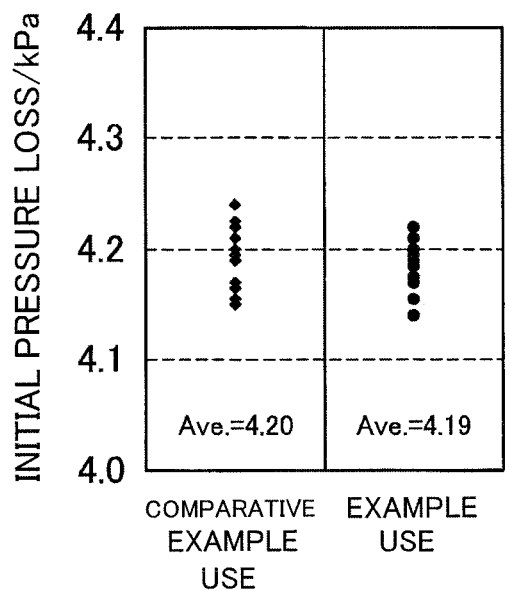
FIG. 6 is a graph showing comparison between values of initial pressure loss of honeycomb structures fired by using the alumina-containing firing member (the example) and the nitride bonded silicon carbide-containing firing member (the comparative example)

FIG. 6 shows comparison between values of initial pressure loss/kPa in honeycomb structures (final products) fired by using the firing members of the example and the comparative example. From this result, it has been confirmed that a performance of the honeycomb structure of the final product is not influenced by differences of the firing members.

A manufacturing method of a silicon carbide-based honeycomb structure of the present invention is usable in firing honeycomb formed bodies containing a silicon carbide-based component which can be utilized especially in a diesel particulate removing filter or the like, to manufacture the honeycomb structure.

DESCRIPTION OF REFERENCE NUMERALS

1: manufacturing method (the manufacturing method of a silicon carbide-based honeycomb structure), 2 and 101: honeycomb formed body, 3 and 106: firing member, 4 and 100: firing furnace, 5 and 108: furnace space, 6: honeycomb segment, 7 and 107: stacked body, 8: argon gas (an inert gas), 9a and 9b: gas flow path, 10: argon gas supplying section, 11: reducing gas, 12: reducing gas adding section, 13 and 110: oxygen component, 14 and 111: reactant, 15 and 102: base plate (a firing member), 16 and 103: shelf plate (a firing member), 16a: shelf plate surface, 17 and 104: frame body (a firing member), 17a: frame body upper surface, 18 and 105: top plate (a firing member), 19: cutout, 20 and 112: gas discharge hole, 21 and 113: furnace wall, 109: decomposition product, H1: formed body height, H2: frame height, S1: firing step, S2: inert gas supplying step, and S3: gas adding step.

What is claimed is:

1. A manufacturing method of a silicon carbide-based honeycomb structure, comprising a firing step of introducing extruded honeycomb formed bodies containing a silicon carbide-based component, together with firing members into a firing furnace, and firing the honeycomb formed bodies, to manufacture the silicon carbide-based honeycomb structure,
   wherein the firing members are formed by using a ceramic material containing 70 wt % or more of alumina, and
   the firing step further comprises:
   an inert gas supplying step of supplying an inert gas to a furnace space of the firing furnace, and
   a gas adding step of adding a reducing gas to the furnace space;
   wherein the gas adding step, the reducing gas is added to the furnace space under the inert gas atmosphere so that a concentration of the reducing gas is from 1 ppm to 5000 ppm.

2. The manufacturing method of the silicon carbide-based honeycomb structure according to claim 1, further comprising:
   a gas premixing step of mixing the inert gas and the reducing gas to generate a mixed gas,
   wherein in the inert gas supplying step and the gas adding step, the mixed gas is supplied or added.

3. The manufacturing method of the silicon carbide-based honeycomb structure according to claim 1,
   wherein the gas adding step is performed after the furnace space is adjusted under an inert gas atmosphere by the inert gas supplying step.

4. The manufacturing method of the silicon carbide-based honeycomb structure according to claim 1,
   wherein as the reducing gas, at least one of a hydrocarbon gas, hydrogen gas and carbon monoxide gas is utilized.

5. The manufacturing method of the silicon carbide-based honeycomb structure according to claim 1,
   wherein the firing members include shelf plates on which the honeycomb formed bodies are to be mounted, and frame bodies which surround the honeycomb formed bodies mounted on the shelf plates and on and under which the honeycomb formed bodies are mounted.

6. The manufacturing method of the silicon carbide-based honeycomb structure according to claim 1,
   wherein the inert gas is an argon gas.

7. The manufacturing method of the silicon carbide-based honeycomb structure according to claim 1, wherein the silicon carbide-based honeycomb structure is disposed on the firing member formed of a ceramic material containing 70 wt % or more of alumina.

* * * * *